(12) United States Patent
Park (10) Patent No.: US 11,068,734 B2
(45) Date of Patent: Jul. 20, 2021

(54) CLIENT TERMINAL FOR PERFORMING HYBRID MACHINE VISION AND METHOD THEREOF

(71) Applicant: IPIXEL CO., LTD., Seoul (KR)

(72) Inventor: Jang Sik Park, Seoul (KR)

(73) Assignee: IPIXEL CO., LTD., Seoul (KR)

( * ) Notice: Subject to any disclaimer, the term of this patent is extended or adjusted under 35 U.S.C. 154(b) by 49 days.

(21) Appl. No.: 16/576,130

(22) Filed: Sep. 19, 2019

(65) Prior Publication Data

US 2020/0151482 A1    May 14, 2020

(30) Foreign Application Priority Data

Nov. 14, 2018    (KR) .................. 10-2018-0139811

(51) Int. Cl.
  *G06K 9/00*    (2006.01)
(52) U.S. Cl.
  CPC ..... *G06K 9/00979* (2013.01); *G06K 9/00664* (2013.01)
(58) Field of Classification Search
  CPC .................. G06K 9/00664; G06K 9/00973
  See application file for complete search history.

(56) References Cited

U.S. PATENT DOCUMENTS

| 2018/0239948 | A1* | 8/2018 | Rutschman | G06T 7/20 |
| 2018/0308180 | A1* | 10/2018 | Bar | G06Q 30/02 |
| 2019/0043622 | A1* | 2/2019 | Ramaci | G16H 20/10 |
| 2020/0160034 | A1* | 5/2020 | Choi | G06K 9/00208 |

FOREIGN PATENT DOCUMENTS

| KR | 10-1557833 B1 | 10/2015 |
| KR | 10-1794016 B1 | 11/2017 |
| KR | 10-1830056 B1 | 2/2018 |
| KR | 10-1855318 B1 | 5/2018 |
| WO | 2015/108243 A1 | 7/2015 |

* cited by examiner

*Primary Examiner* — John J Lee
(74) *Attorney, Agent, or Firm* — Sughrue Mion, PLLC (57) ABSTRACT

A client terminal according to an embodiment of the present invention includes: a communication unit receiving a request for object recognition; a recognition unit performing the object recognition through machine vision; a determination unit determining devices that will perform distributed object recognition; and a control unit setting parameters affecting the object recognition, and performing learning for the object recognition through artificial intelligence on the basis of the set parameters, wherein the control unit controls the determination unit to determine the devices by taking into account the parameters when the request for object recognition is received, and controls the recognition unit to integrate results obtained from the devices performing the distributed object recognition so as to perform the object recognition.

15 Claims, 6 Drawing Sheets

| parameter | parameter value | | | | | | | | | |
|---|---|---|---|---|---|---|---|---|---|---|
| distributed processing | 0 | 1 | 2 | 3 | 4 | 5 | 6 | 7 | 8 | 9 |
| device performing object recognition | performing in client terminal | performing in server | | | | performing in client terminal or server | performing in client terminal and then performing in server when necessary | | | |

Fig. 8

CLIENT TERMINAL FOR PERFORMING HYBRID MACHINE VISION AND METHOD THEREOF

CROSS REFERENCE TO RELATED APPLICATION

The present application claims priority to Korean Patent Application No. 10-2018-0139811, filed Nov. 14, 2018, the entire contents of which is incorporated herein for all purposes by this reference.

BACKGROUND OF THE INVENTION

Field of the Invention

The present invention relates to a client terminal for performing hybrid machine vision, and a method thereof. More particularly, the present invention relates to a client terminal for performing hybrid machine vision, and a method thereof, wherein the mobile terminal performs machine vision that performs object recognition in a real-time for an image or video through learning by artificial intelligence, while the machine vision is distributed to a server so as to be also performed therein.

Description of the Related Art

Machine vision is a technique of recognizing an object through a machine. Machine vision can be applicable in various forms such as object recognition, face recognition, image capture, text recognition, etc. For example, for the product inspection field that is a part of machine vision, vision inspection apparatuses that are automated inspection equipment are used for inspecting products by using industrial cameras and wired/wireless networks. Herein, an image is obtained by capturing a product by using a camera, and the captured image is analyzed by using a computer so as to detect exterior defects, impurity defects, dimensional defects, etc. Accordingly, a process of inspecting defects visually inspected by operators is automated, and thus production efficiency can be improved and objective and accurate quality control can be achieved. In addition, recently, machine vision has become more powerful through deep learning.

Generally, machine vision is employed by using dedicated hardware so as to perform image analysis through processing using high-performance cameras and PCs. When the above requirements are not satisfied, it is difficult to achieve improvement in recognition rate through continuous learning such as deep learning.

In recently introduced machine vision through deep learning, a processing speed and a recognition rate are degraded due to limits in hardware performance when the machine vision is performed in a mobile terminal, and thus there is a strong tendency to rely on hardware performance of the mobile terminal. Accordingly, quality of service significantly varies according to a user environment such as performance of a mobile terminal.

Also, when machine vision through deep learning is performed through a server, limits due to on/off-line environmental states (for example, performing machine vision is impossible when a connection state to the server is an off line state) are present, and degradation in response speed due to transmission processing and response times to the server through a network are also present.

The foregoing is intended merely to aid in the understanding of the background of the present invention, and is not intended to mean that the present invention falls within the purview of the related art that is already known to those skilled in the art.

SUMMARY OF THE INVENTION

The present invention is to provide a client terminal for performing hybrid machine vision, and a method thereof, wherein the mobile terminal performs machine vision that performs object recognition in a real-time for an image or video through learning by artificial intelligence, while the machine vision is distributed to a server so as to be also performed therein.

In addition, the present invention is to provide a client terminal for performing hybrid machine vision, and a method thereof, wherein an object recognition rate and a processing speed are improved regardless of hardware performance of the mobile terminal and a user environment.

Further, the present invention is to provide a client terminal for performing hybrid machine vision, and a method thereof, wherein an accuracy of image analysis of photos and videos which are real-time data collected through a mobile camera, or an accuracy of object recognition, and a response speed are improved.

Technical solutions obtainable from the present disclosure are not limited to the above-mentioned technical solutions, and other unmentioned technical solutions can be clearly understood from the following description by those having ordinary skill in the art to which the present invention belongs.

A client terminal according to an embodiment of the present invention includes: a communication unit receiving a request for object recognition; a recognition unit performing the object recognition through machine vision; a determination unit determining devices that will perform distributed object recognition; and a control unit setting parameters affecting the object recognition, and performing learning for the object recognition through artificial intelligence on the basis of the set parameters, wherein the control unit controls the determination unit to determine the devices by taking into account the parameters when the request for object recognition is received, and controls the recognition unit to integrate results obtained from the devices performing the distributed object recognition so as to perform the object recognition.

A method of performing hybrid machine vision in a client terminal according to another embodiment of the present invention includes: setting parameters affecting object recognition, and performing learning for the object recognition through artificial intelligence on the basis of the set parameters; receiving a request for object recognition; determining devices that will perform distributed object recognition; and performing the object recognition through machine vision, wherein the devices are determined by taking into account the parameters when the request for object recognition is received, and the object recognition is performed by integrating results obtained from the devices performing the distributed object recognition.

According to embodiment of the present invention, loads imposed on only one side of the mobile terminal or the server can be reduced, and all the benefits of performing machine vision in both of the mobile terminal and the server can be obtained.

In addition, according to embodiment of the present invention, when performing machine vision, an object recognition rate and a processing speed can be improved regardless of hardware performance or user environment.

Further, according to embodiment of the present invention, an accuracy of image analysis for photos and videos that are real-time data or an accuracy of object recognition, and a response speed can be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, specific embodiments of the present invention will be described in detail with reference to the drawings. The present inventive concept may, however, be embodied in many different forms and should not be construed as limited to the example embodiments set forth herein. Rather, the described aspect is intended to embrace all such alterations, modifications, and variations that fall within the scope and novel idea of the present disclosure.

The terminology used herein has been chosen from a general term that is commonly used in the art. However, the meaning of specific terms or words used in the specification and claims should not be limited to the literal or commonly employed sense, but should be construed or may be different in accordance with the intention of the present invention. Therefore, the definition of the specific terms or words should be based on the contents across the specification.

The term "machine vision" is used herein to mean methods used to provide imaging-based automatic inspection and analysis for such applications.

Further, the term "hybrid machine vision" is used herein to refer to include the machine vision being performed by having machine vision jobs distributed to different devices (for example, a client and a server) and the results obtained from the different devices integrated.

Further, the terms "include" or "comprise", as well as derivatives thereof, when recited in the claims, it means that it is possible for a part or the like to include or comprise other components further rather than to exclude other components.

Figure 1:
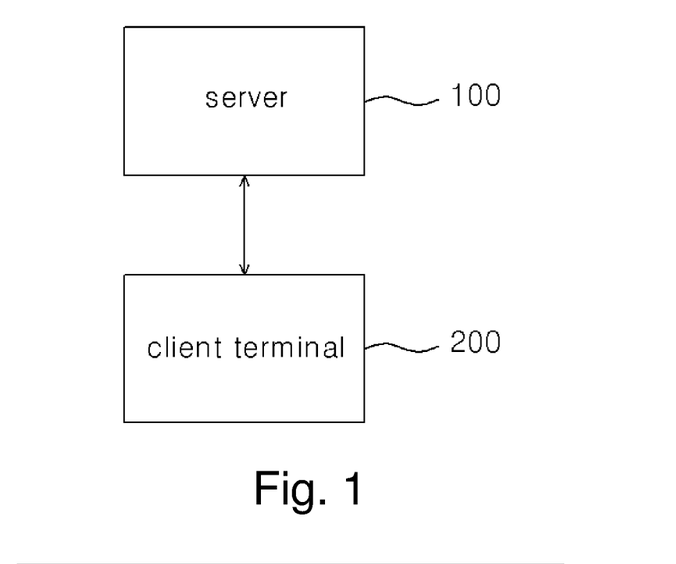
FIG. 1 is a view showing a server and a client terminal for performing hybrid machine vision according to an embodiment of the present invention.

FIG. 1 is a view showing a server and a client terminal for performing hybrid machine vision according to an embodiment of the present invention.

A server 100 may perform machine vision.

In detail, the server 100 may perform machine vision jobs on an object when the server 100 receives a request for object recognition from a client terminal 200. According to an embodiment, the server 100 may independently perform machine vision jobs, or may receive a request for machine vision jobs to perform the same together with the client terminal 200.

The server 100 may include hardware (H/W) and software (S/W) capable of performing machine vision jobs.

According to an embodiment, the hardware and the software may be dedicated hardware and software that are specialized for machine vision jobs. For example, the hardware may include an industrial camera, an optical character recognition (OCR) device, etc. for performing object recognition. In addition, the software may include a program, an algorithm, etc. performing image analysis.

According to another embodiment, the hardware and the software may be general hardware and software performing various jobs in addition to machine vision jobs. For example, the hardware may include a processor, an MCU, a graphic controller, a camera, etc. In addition, the software may include a program or algorithm for performing control or image processing.

The server 100 may be an electronic device. For example, the server 100 may be employed by using a central processing device, a control device, a PC, a laptop computer, etc. which are in a remote location or spaced apart from the client terminal 200.

The client terminal 200 may receive a request for object recognition from a user.

The client terminal 200 may assign machine vision jobs for object recognition. In detail, the client terminal 200 may analyze content of the request for object recognition and a user environment, and assign machine vision jobs to the server 100 and the client terminal 200 accordingly.

Herein, the content of the request for object recognition may include an object type or feature, an object size, detailed jobs of recognition, etc. Also, the user environment may include an environment of the client terminal, a server environment, and a network environment. The environment of the client terminal may include a hardware type or performance, software type or performance and version, etc. of the client terminal 200. The server environment may include hardware performance, a software version, a processing speed, a response speed, a resource usage rate, etc. of the server 100. Also, the network environment may include a network transmission speed, a bandwidth, etc.

Also, the client terminal 200 may perform machine vision.

In detail, the client terminal 200 may perform machine vision jobs on a corresponding object when the client terminal 200 receives a request for object recognition. According to an embodiment, the client terminal 200 may independently perform machine vision jobs, or perform machine vision jobs together with the server 100.

The client terminal 200 may include hardware and software capable of performing machine vision jobs.

According to an embodiment, the hardware and the software may be dedicated hardware and software that are specialized for machine vision jobs. For example, the hardware may include an industrial camera, an OCR device, etc. for performing object recognition. In addition, the software may include a program, an algorithm, etc. performing image analysis.

According to another embodiment, the hardware and the software may be general hardware and software performing various jobs in addition to machine vision jobs. For example, the hardware may include a processor, an MCU, a graphic controller, a camera, etc. In addition, the software may include a program or algorithm for performing control or image processing.

The client terminal 200 may be an electronic device. For example, the client terminal 200 may be a mobile device, a laptop computer, etc. carried by the user or provided on a user side.

Figure 2:
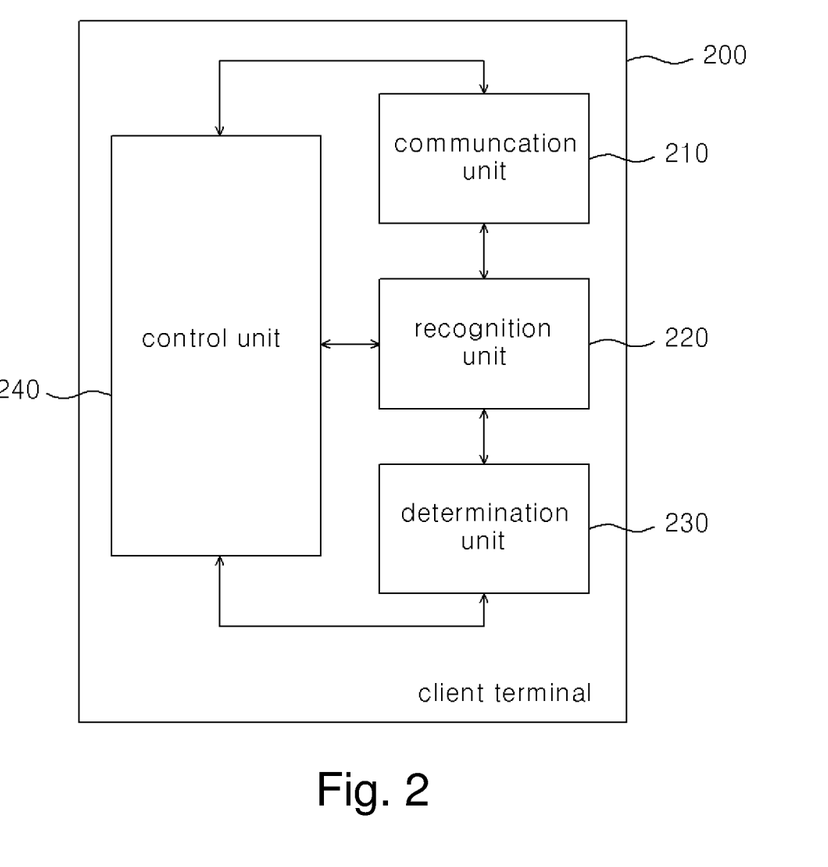
FIG. 2 is a view showing a configuration diagram of the client terminal for performing hybrid machine vision according to an embodiment of the present invention.

FIG. 2 is a view showing a configuration diagram of the client terminal for performing hybrid machine vision according to an embodiment of the present invention.

The client terminal 200 for performing hybrid machine vision according to an embodiment of the present invention may include a communication unit 210, a recognition unit 220, a determination unit 230, and a control unit 240.

The communication unit 210 may receive a request for object recognition from a user.

Herein, the communication unit 210 may receive the request for object recognition from the user through an user interface such as touch screen, input device, voice input device, etc. which are provided in the client terminal 200. Herein, the object recognition may include detecting or tracking an object in an image or video, performing an exterior inspection of the object, performing size measurement of the object, or performing defect detection of the object, etc.

The communication unit 210 may transmit machine vision jobs that are distributed and assigned to the server 100. For example, the communication unit 210 may transmit content information on jobs that will be performed by the server 100, an image or video on which machine vision is performed, etc.

The communication unit 210 may receive from the server 100 results of the machine vision jobs performed by the server 100.

For the same, the communication unit 210 may perform communication with the server 100.

In detail, the communication unit 210 may perform various wired/wireless communication including optical communication, power line communication, WiFi communication, LAN communication, mobile network communication, etc. with the server 100. The communication unit 210 may select or change the type of communication with the server 100 according to performance, a network environment, etc. of the server 100 or client terminal 200.

The recognition unit 220 may perform object recognition through machine vision.

Herein, the recognition unit 220 may perform object recognition by integrating results obtained from devices that perform distributed object recognition.

The determination unit 230 may determine devices that will perform distributed object recognition.

Herein, the determination unit 230 may determine devices that will perform distributed object recognition by taking into account parameters that affect the object recognition.

In detail, the determination unit 230 may assign machine vision jobs for object recognition to the devices. Herein, the determination unit 230 may analyze content of a request for object recognition and a user environment, and assign and distribute machine vision jobs to the server 100 and the client terminal 200 accordingly.

Herein, the content of the request for object recognition may include an object type or feature, an object size, detailed jobs of object recognition, etc. For example, when an object is finely small (in case of detecting product defects by using an image obtained by capturing the product), machine vision jobs may be completely assigned to the server 100 having better image analysis performance. Also, when the detailed jobs of object recognition indicates that an amount of jobs is small and the jobs are simple but a rapid result thereof is required, machine vision jobs may be completely assigned to the client terminal 200.

According to an embodiment, the determination unit 230 may convert hardware performance (for example, hardware performance of smartphone) of the client terminal 200, a response speed, a resource usage rate of the server 100, a network speed, complexity of a recognition target, an accuracy of user requirements (for example, applicable contents), etc. into quantified values, and determine devices that will perform distributed object recognition jobs on the basis of the quantified values.

In addition, the user environment may include an environment of the client terminal, and a server environment. The environment of the client terminal may include a hardware type or performance, a software type or performance and version, etc. of the client terminal 200. For example, when a version of software installed in the client terminal 200 does not provide an image analysis function, machine vision jobs may be completely assigned to the server 100. The server environment may include hardware performance, a software version, a processing speed, a response speed, a network transmission speed, etc. of the server. For example, when a processing speed is significantly low due to work-load of the server 100, machine vision jobs may be completely assigned to the client terminal 200.

The control unit 240 may perform hybrid machine vision.

In detail, the control unit 240 sets parameters affecting object recognition, and performs learning for object recognition through artificial intelligence on the basis of the set parameters. Subsequently, when the control unit 240 receives a request for object recognition, the control unit 240 may control the determination unit 230 so as to determine devices that will perform object recognition jobs by taking into account the parameters, and control the recognition unit 220 so as to perform object recognition by integrating results obtained from the devices that perform the distributed object recognition jobs.

According to an embodiment, the control unit 240 may control the determination unit 230 so as to convert the parameters into quantified values, and to determine devices on the basis of the quantified values.

Herein, the parameters may include a static parameter, a dynamic parameter, and an unavoidable parameter. The static parameter is a parameter having a fixed value according to an environment where machine vision is performed. For example, the static parameter may include hardware performance, software performance, and a general usage network of the client terminal. The dynamic parameter is a parameter having a variable value according to an execution time of machine vision. For example, the dynamic parameter may include a usage rate of the server 100 performing communication with the client terminal 200, a processing speed or response speed of the server 100, a network speed, a network bandwidth, object complexity, etc. Also, the unavoidable parameter is a parameter that causes a specific device to be determined when a specific condition is satisfied. For example, the unavoidable parameter may include an on/off state of a network, etc.

The control unit 240 may transmit again the request for object recognition to the server 100 when it is determined that an accuracy of the result of the object recognition does not satisfy a predetermined reference.

The control unit 240 may perform hybrid machine vision through artificial intelligence. According to an embodiment, artificial intelligence may be deep learning.

Figure 3:
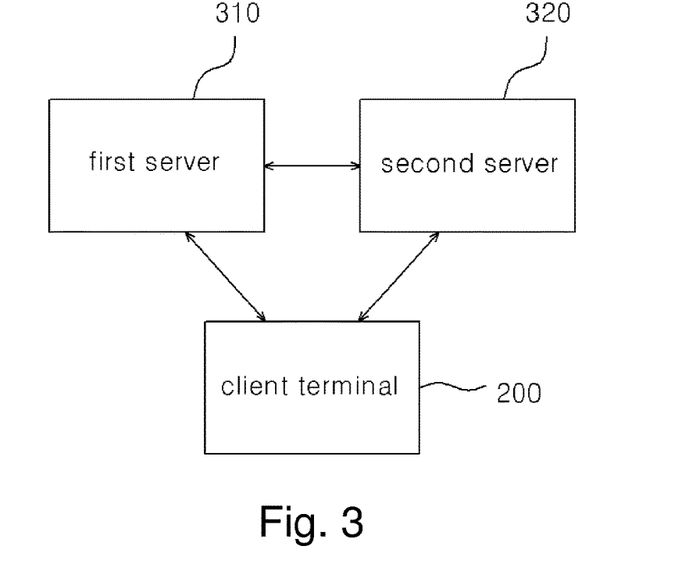
FIG. 3 is a view showing a server and a client terminal for performing hybrid machine vision according to another embodiment of the present invention.

FIG. 3 is a view showing a client terminal and a server for performing hybrid machine vision according to another embodiment of the present invention.

In FIG. 3, a client terminal 200 and servers 310 and 320 are fundamentally identical to those described with reference to FIG. 1, and thus, hereinafter, same descriptions will not be repeated and only different or added content will be described below.

A plurality of servers 310 and 320 may perform hybrid machine vision.

In detail, the plurality of servers 310 and 320 may perform machine vision jobs for object recognition distributed thereto. For example, the first server 310 and the second server 320 may independently perform jobs that are assigned to them respectively among machine vision jobs. For the same, the first server 310 and the second server 320 may respectively include hardware and software capable of performing machine vision jobs.

The first server 310 and the second server 320 may perform machine vision jobs for an object when the first server 310 and the second server 320 receive a request for object recognition from the client terminal 200. According to an embodiment, the first server 310 and the second server 320 may independently perform machine vision jobs, or may receive a request for machine vision jobs to perform the same together with the client terminal 200.

The client terminal 200 may assign machine vision jobs for object recognition to the plurality of servers 310 and 320. In detail, the client terminal 200 may analyze content of a request for object recognition and a user environment, and assign and distribute machine vision jobs to the first server 310, the second server 320, and the client terminal 200 accordingly. For example, when it is determined that the servers 310 and 320 have to perform corresponding machine vision jobs due to hardware performance problem of the client terminal 200, and a rapid response thereof is required, the client terminal 200 may assign machine vision jobs to the server 310 or 320 with the faster processing speed between the first server 310 and the second server 320.

The client terminal 200 may perform hybrid machine vision.

According to an example, the client terminal 200 may independently perform machine vision jobs, perform machine vision jobs with any one of the first server 310 or the second server 320, or perform machine vision jobs with both of the first server 310 and the second server 320.

Figure 4:
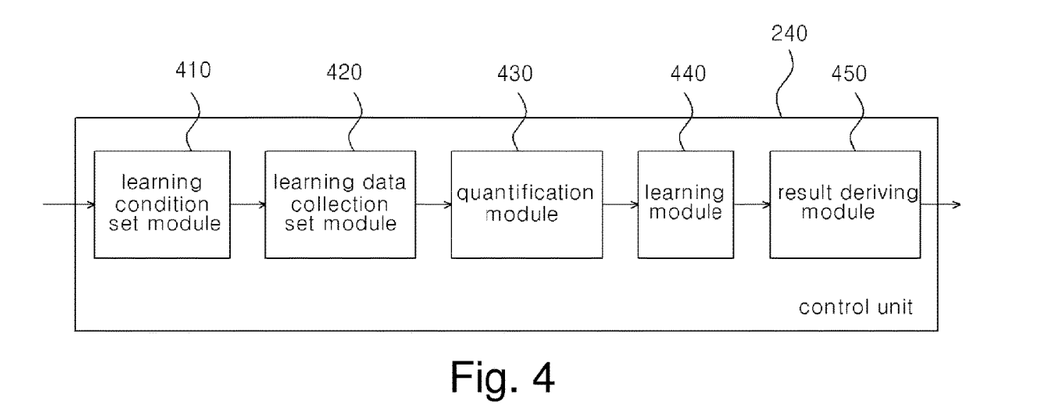
FIG. 4 is a view showing a detailed configuration of a control unit included in the client terminal for performing hybrid machine vision according to an embodiment of the present invention.

FIG. 4 is a view showing a detailed configuration of the control unit included in the client terminal for performing hybrid machine vision according to an embodiment of the present invention.

The control unit 240 may perform machine vision through artificial intelligence. According to an embodiment, artificial intelligence may be deep learning.

For the same, the control unit 240 may include a learning condition set module 410, a learning data collection module 420, a quantification module 430, a learning module 440, and a result deriving module 450.

The learning condition set module 410 may set a learning condition for performing learning for hybrid machine vision through deep learning. According to an embodiment, the learning condition set module 410 may set a learning condition so as to obtain the optimum result. Herein, the learning condition may include hardware performance of the client terminal 200 (for example, hardware performance of smartphone), a resource usage rate of the server, a network speed, complexity of a recognition target, an accuracy of user requirements (for example, whether or not contents is additionally necessary, whether or not detailed information on the user is required), etc.

The learning data collection module 420 may collect learning data for performing learning for machine vision through deep learning. Herein, the learning data may be collected for each of the learning condition set by the learning condition set module 410. For example, the learning data collection module 420 may collect data for each of hardware performance of the client terminal 200, a resource usage rate of the server 100, a network speed, complexity of a recognition target, an accuracy of user requirements, etc.

The quantification module 430 may quantify the learning data.

In detail, the quantification module 430 may convert the learning data into quantified values. Herein, the quantification module 430 sets the learning data as distributed processing parameters, and classify into a static parameter (static value), a dynamic parameter (dynamic value), and an unavoidable parameter (unavoidable value).

Herein, the distributed processing parameter is a parameter used for determining devices that will perform distributed jobs for hybrid machine vision, and may be quantified by using a predetermined equation. This will be described later with reference to FIG. 8.

The learning module 440 performs learning through artificial intelligence on the basis of the learning data converted into quantified values. In detail, the learning module 440 may perform machine vision on the quantified values through deep learning.

The learning module 440 may establish learning data for a weighting factor of a response speed. Herein, the learning module 440 may calculate the optimum weighting factor by using a reference of the response speed and a final resulting value of object recognition according thereto, and periodically update the same to a database 500.

The result deriving module 450 may select the optimized processing path according to the learning result.

Figure 5:
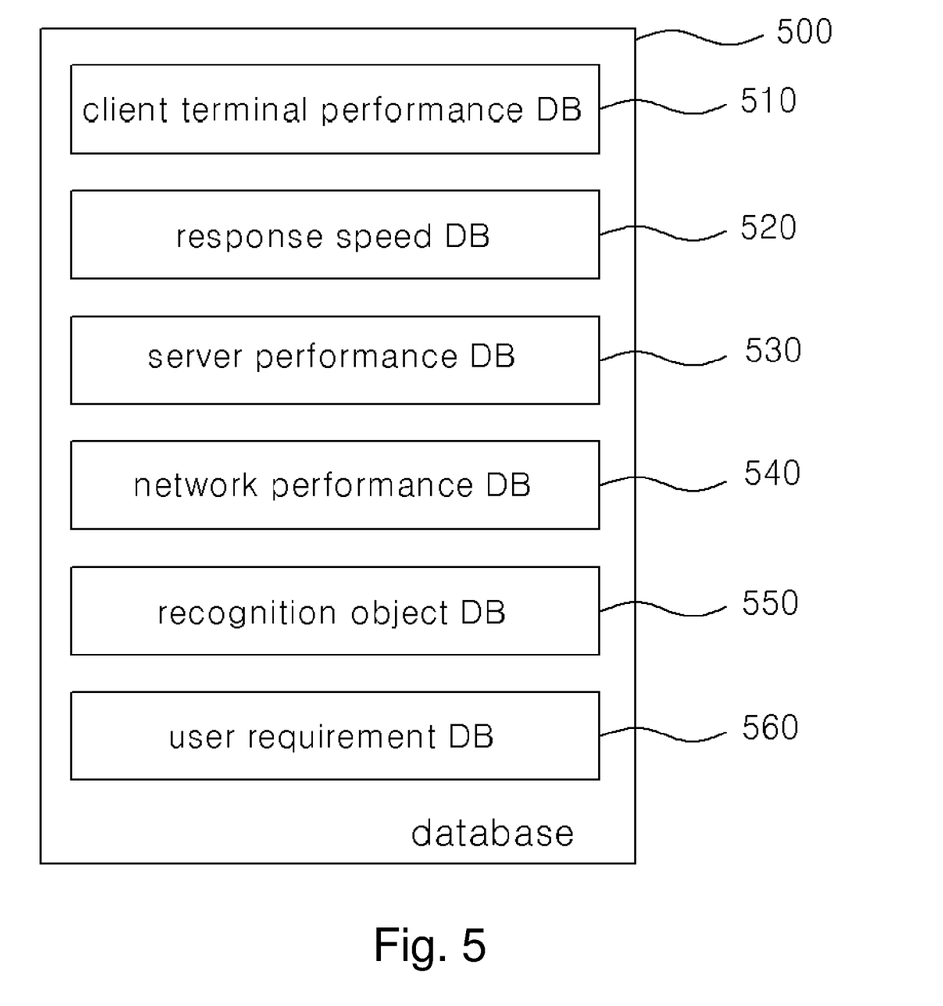
FIG. 5 is a view showing a detailed configuration of a database managed by the client terminal for performing hybrid machine vision according to an embodiment of the present invention.

FIG. 5 is a view showing a detailed configuration of a database managed by the client terminal for performing hybrid machine vision according to an embodiment of the present invention.

The client terminal 200 may manage a database 500 for performing hybrid machine vision through artificial intelligence. Herein, the database 500 may include a client terminal performance DB 510, a response speed DB 520, a server performance DB 530, a network performance DB 540, a recognition object DB 550, a user requirement DB 560, etc.

The client terminal performance DB 510 may be for storing data related to performance of the client terminal 200. For example, data of hardware performance (for example, hardware performance of smartphone), performance or version of installed software, etc. may be stored.

The response speed DB 520 may store data related to a response degree of machine vision jobs. For example, data of a response speed, a response degree, etc. may be stored.

The server performance DB 530 may store data related to performance of the server 100. For example, data of a resource usage rate of the server, etc. may be stored.

The network performance DB 540 may store data related to performance of the network. For example, data of a network speed, a network bandwidth, network connection, etc. may be stored.

The recognition object DB 550 may store data on targets on which machine vision jobs are performed. For example, data of complexity of a recognition target, etc. may be stored.

The user requirement DB 560 may store data related to machine vision jobs that are requested from the user. For example, data of an accuracy of user requirements (for example, whether or not contents is additionally necessary, whether or not detailed information of the user is required), etc. may be stored.

Figure 6:
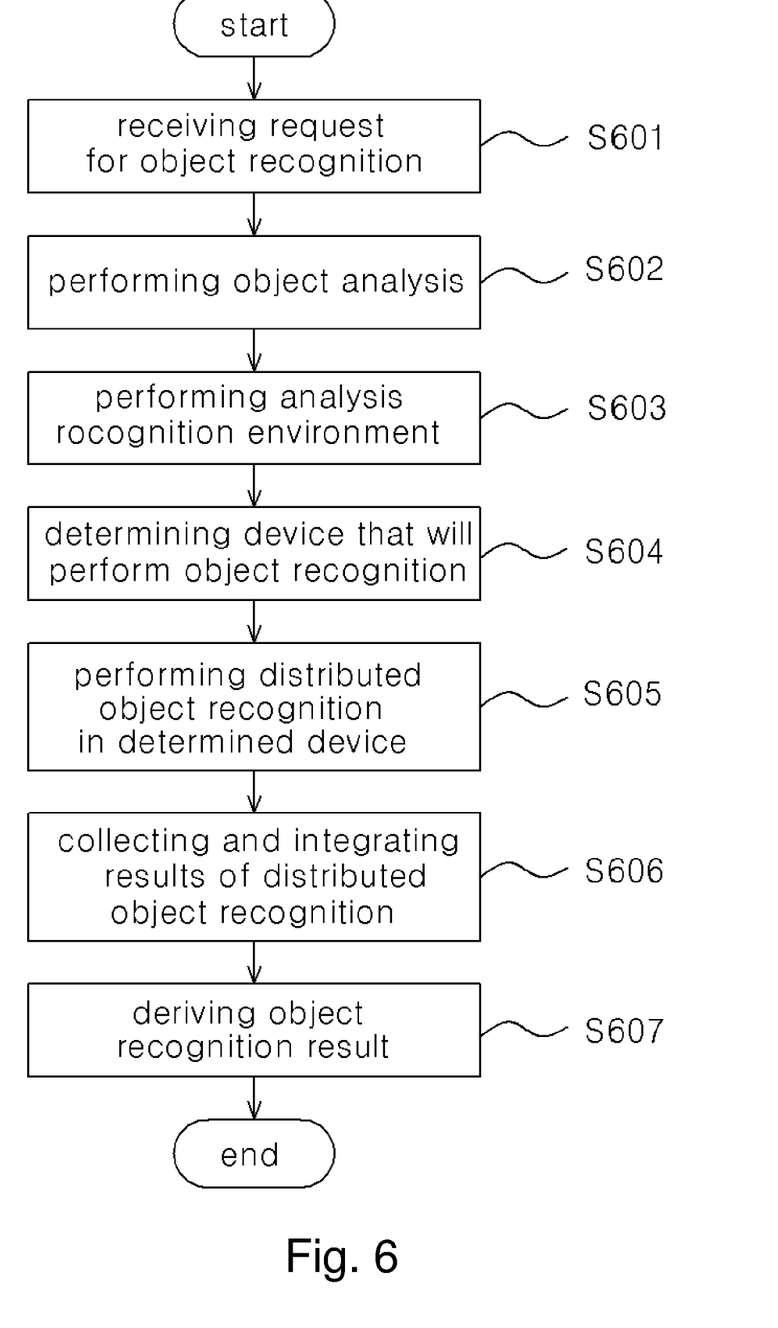
FIG. 6 is a view showing a process of performing hybrid machine vision according to an embodiment of the present invention.

FIG. 6 is a view showing a process of performing hybrid machine vision according to an embodiment of the present invention.

Referring to FIG. 6, in S601, the client terminal 200 receives a request for object recognition.

Herein, client terminal 200 may receive the request for object recognition from a user through a user interface such as touch screen or input device, voice input device, etc. which are provided in the corresponding client terminal 200. Herein, the object recognition may include detecting or tracking an object in an image or video, performing an exterior inspection of the object, performing size measurement of the object, or performing defect detection of the object, etc.

In S602, the client terminal 200 analyzes the object.

In detail, the client terminal 200 may analyze information on a type or feature of the object, content of the request for object recognition, details on an image or video where the object is included, expected jobs and an amount thereof, etc.

In S603, the client terminal 200 analyzes a recognition environment.

Herein, the recognition environment is a user environment, and may include an environment of the client terminal, a server environment, and a network environment. The environment of the client terminal may include a hardware type or performance of the client terminal 200, a software type or performance, version, etc. of the client terminal 200. The server environment may include a hardware performance, a software version, a processing speed, a response speed, a resource usage rate, etc. of the server 100. The network environment may include a network transmission speed, a bandwidth, etc.

In S604, the client terminal 200 determines devices that will perform object recognition.

In detail, the client terminal 200 may determine devices that will perform machine vision on the basis of the analysis result of the object and the recognition environment. Herein, the client terminal 200 may quantify a learning condition so as to obtain the result, and select the optimum processing path according to the optimum result. Herein, the learning condition may include hardware performance of the client terminal 200, a resource usage rate of the server, a network speed, complexity of a recognition target, an accuracy of user requirement (for example, whether or not contents is necessary, whether or not detail information of the user is required), etc.

According to an embodiment, the client terminal 200 may perform object recognition (detection and classification) and determine devices that will perform machine vision so as to ensure immediate response results. For example, even though processing performance of the server 100 is generally higher than that of the client terminal 200, when multiple users transmit requests for machine vision to the server 100, the server 100 provides processing capability relatively lower than the client terminal 200. Accordingly, the client terminal 200 may appropriately select the client terminal 200 and the server 100 as devices for performing machine vision so as to achieve the user's desired purpose. Accordingly, the user may be provided with the same level of processing results (for example, response speed, quality, user experience) compared to normal users under a situation where the client terminal 200 provides low specification or low performance or where a network situation is not good.

According to another example, the client terminal 200 may determine devices that will perform machine vision such that a machine vision result is ensured to a predetermined level of accuracy. For example, when it is determined that a resulting accuracy of machine vision jobs does not satisfy a predetermined level, the client terminal 200 may automatically transmit the corresponding jobs to the server 100 to perform the same so as to improve the resulting accuracy of the machine vision.

In S605, the client terminal 200 distributes object recognition jobs on the basis of the determined devices.

In detail, the client terminal 200 may assign object recognition jobs to the devices on the basis to the determined devices. For example, the client terminal 200 may assign all object recognition jobs to the server 100, assign all object recognition jobs to the corresponding client terminal 200, or assign recognition jobs to the server 100 and the corresponding client terminal 200 by dividing the jobs.

The client terminal 200 may perform jobs assigned to the corresponding client terminal 200 itself. When all object recognition jobs are assigned to the client terminal 200, or a part of object recognition jobs are assigned to the client terminal 200, the client terminal 200 may perform the assigned jobs. On the contrary, when all object recognition jobs are assigned to the server 200, there are no jobs to be performed by the client terminal 200 as the client terminal 200 has not received a job assignment.

In S606, the client terminal 200 collects and integrates results of the distributed object recognition jobs.

Herein, the client terminal 200 receives from respective devices to which object recognition jobs are assigned results of the performed object recognition jobs, and integrates the results.

In S607, the client terminal 200 derives an object recognition result.

The client terminal 200 may determine details related to object recognition on the basis of the integrated results, and derive the object recognition result from the determined details.

As described above, according to machine vision using artificial intelligence according to the present invention, the portability and the immediacy of a mobile device can be utilized as much as possible, and at the same time, processing performance of the server can be also utilized to the fullest. Accordingly, it can provide, in addition to fast and accurate services, the same level of service quality regardless of various customer usage environments.

Figure 7:
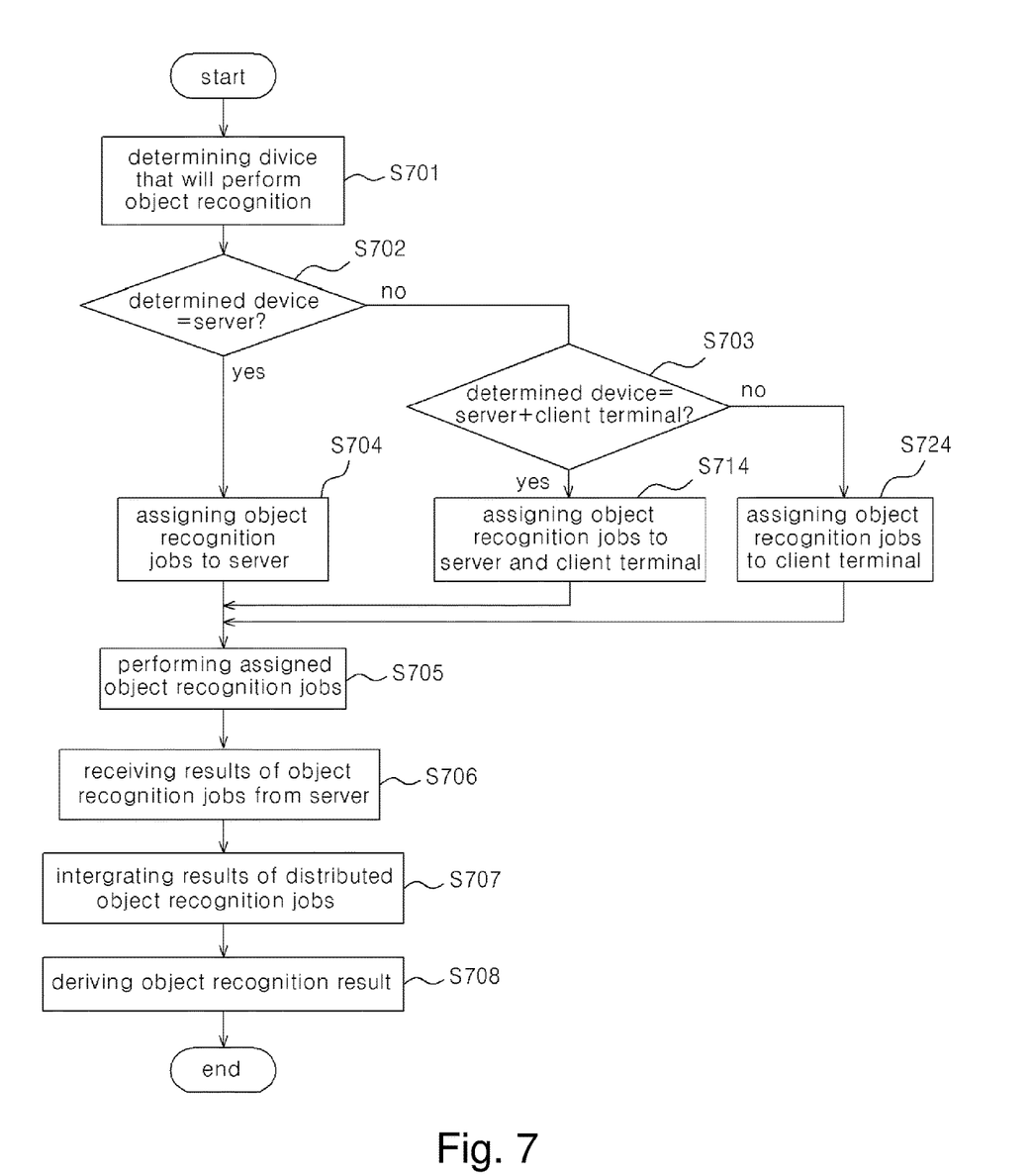
FIG. 7 is a view showing a detailed process of performing hybrid machine vision according to an embodiment of the present invention.

FIG. 7 is a view showing a detailed process of performing hybrid machine vision according to an embodiment of the present invention.

In S701, the client terminal 200 determines a device that will perform object recognition.

In S702, the client terminal 200 determines whether or not the determined device is the server.

When it is determined that the determined device is the server (S702—Yes), in S704, the client terminal 200 assigns object recognition jobs to the server 100.

On the contrary, when it is determined that the determined device is not the server (S702—No), in S703, the client terminal 200 determines whether or not the determined device is the server 100 and the client terminal 200. Herein, when the determined device is the server 100 and the client terminal 200 (S703—Yes), in S714, the client terminal 200 distributes and assigns object recognition jobs to the server 100 and the client terminal 200. However, when the determined device is not the server 100 and the client terminal 200 (S703—No), in S724, the client terminal 200 assigns object recognition jobs to the client terminal 200.

In S705, the client terminal 200 and the server 100 respectively perform the assigned object recognition jobs.

In S706, the client terminal 200 receives results of the object recognition jobs from the server 100.

In S707, the client terminal 200 integrates the results of the distributed object recognition jobs.

Subsequently, in S708, the client terminal 200 derives an object recognition result.

Figure 8:
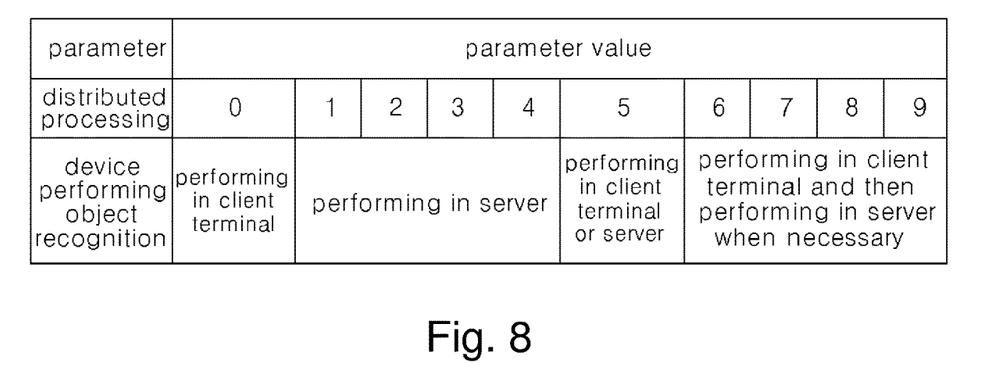
FIG. 8 is a view showing a method of determining devices that will perform jobs on the basis of quantified distributed processing parameters, relating to performing hybrid machine vision according to an embodiment of the present invention.

FIG. 8 is a view showing a method of determining a device that will perform object recognition jobs on the basis of quantified distributed processing parameters, relating to hybrid machine vision according to an embodiment of the present invention.

The distributed processing parameters may be defined as parameters used for determining distributed devices for hybrid machine vision. Herein, the distributed processing parameters may be set as factors that become a reference of the distributed processing. For example, the distributed processing parameters may be set as hardware performance (for example, performance of GPU (graphics processing unit), CPU (central processing unit), memory, display, camera, etc.) of the client terminal 200, a resource usage rate (for example, usage rate, bandwidth) of the server, a network speed, a communication service type (for example, 3G, 4G, LTE, 5G, wired network, etc.), complexity of a recognition target, an accuracy of user requirement, network connection (for example, online/offline), etc.

In order to quantify the distributed processing parameters, an equation is defined as below.

$$\text{distributed processing parameter} = \text{static parameter} (p+s, a) + \text{dynamic parameter} (u, s+c) + \text{unavoidable parameter} (o) \quad \text{[Equation 1]}$$

Herein, a static parameter may include hardware performance (p), a used communication network (s), an accuracy of user requirements (a), etc. The above static parameters are set when the application is executed first after installation, and a weighting factor may be applied to each value. For example, hardware performance of the smartphone has a fixed value, and the application is newly installed when the user changes his or her smartphone.

A dynamic parameter may include a server usage rate (for example, margin) (u), a network speed (s), complexity of a recognition target (c), etc. For example, the network speed is a dynamic parameter as the same varies according to a location and usage time of the user. The dynamic parameter may be calculated whenever the application is executed.

An unavoidable parameter (o) may include an on/off state of the network. In case of an offline state, an unavoidable value may be applied.

Meanwhile, the network speed may be a static parameter according to a service network (3G, 4G, LTE, 5G, etc.) of the user, but may become a dynamic parameter according to a location and usage time of the user.

The client terminal 200 selects devices that will perform distributed machine vision on the basis of distributed processing parameters that are converted into quantified values.

In detail, values of the distributed processing parameters may be values ranging from 0 to 9, and a median value thereof is 5.

When the value of the distributed processing parameter is 0, hybrid machine vision jobs are assigned to the client terminal 200. In detail, when the value of the distributed processing parameter is 0, the client terminal 200 determines that a connection state with the server as an offline state. Accordingly, machine vision jobs are only performed in the client terminal 200.

When the value of the distributed processing parameter is equal to or greater than 1 and equal to or smaller than 4, hybrid machine vision jobs are assigned to the server 100. Herein, the client terminal 200 determines that the processing in the server 100 is efficient in terms of processing speed, responsiveness, and accuracy on the basis of the definition of the distributed processing parameters, and assigns machine vision jobs to the server 100 so as to perform the assigned jobs.

On the contrary, when the value of the distributed processing parameter is equal to or greater than 6 and equal to or smaller than 9, hybrid machine vision jobs are assigned to be performed in the client terminal 200 and then performed in the server 100 when necessary. Herein, the client terminal 200 determines that processing efficiency is high when hybrid machine vision jobs are performed in the client terminal 200. However, when the result in the client terminal 200 does not satisfy a predetermined level, the corresponding machine vision jobs are transmitted to the server 100 so as to be performed therein.

When the value of distributed processing parameter is 5, hybrid machine vision jobs are assigned to the client terminal 200 or server 100. Herein, as the value of distributed processing parameter is the median value, the client terminal 200 determines that the processing efficiency in each of the server 100 and the client terminal 200 is the same. Accordingly, machine vision jobs can be assigned to any one of two devices according to a situation.

Meanwhile, the above-described method can be written as a program executable in a computer, and can be implemented in a general-purpose digital computer operating the program using a computer readable medium. In addition, the structure of data used in the above-described method can be recorded on the computer-readable medium through various means. It should be understood that program storage devices that can be used to describe storage devices including computer code or program executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

Although preferred embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A client terminal, the client terminal comprising:
a communication unit receiving a request for object recognition;
a recognition unit performing object recognition through machine vision;
a determination unit determining devices that are configured to perform distributed object recognition; and
a control unit setting parameters affecting the object recognition, and performing learning for the object recognition through artificial intelligence on the basis of the set parameters,
wherein the control unit controls the determination unit to determine the devices by taking into account the parameters when the request for the object recognition is received, and controls the recognition unit to integrate results obtained from the devices performing the distributed object recognition so as to perform the object recognition.

2. The client terminal of claim 1, wherein the control unit converts the parameters into quantified values, and controls the determination unit to determine the devices on the basis of the quantified values.

3. The client terminal of claim 1, wherein the parameters include:
a static parameter having a static value according to an environment where the machine vision is performed;
a dynamic parameter having a value varying according an execution time of the machine vision; and
an unavoidable parameter causing a specific device to be determined when a predetermined condition is satisfied.

4. The client terminal of claim 3, wherein the static parameter includes at least one of hardware performance, software performance, and a general usage network of the client terminal.

5. The client terminal of claim 3, wherein the dynamic parameter includes at least one of a usage rate of a server communicating the client terminal, a processing speed or response speed of the server, a network speed, a network bandwidth, and object complexity.

6. The client terminal of claim 3, wherein the unavoidable parameter includes an on/off state of a network.

7. The client terminal of claim 1, wherein the control unit transmits the request for object recognition to the server when it is determined that a resulting accuracy of the object recognition does not satisfy a predetermined reference.

8. A method of performing hybrid machine vision in a client terminal, the method comprising:
setting parameters affecting object recognition, and performing learning for the object recognition through artificial intelligence on basis of the set parameters;
receiving a request for object recognition;
determining devices that are configured to perform distributed object recognition; and
performing the object recognition through machine vision,
wherein the devices are determined by taking into account the parameters when the request for the object recognition is received, and the object recognition is performed by integrating results obtained from the devices performing the distributed object recognition.

9. The method of claim 8, wherein the parameters are converted into quantified values, and the devices are determined on the basis of the quantified values.

10. The method of claim 8, wherein the parameters include:
a static parameter having a static value according to an environment where the machine vision is performed;
a dynamic parameter having a value varying according an execution time of the machine vision; and
an unavoidable parameter causing a specific device to be determined when a predetermined condition is satisfied.

11. The method of claim 10, wherein the static parameter includes at least one of hardware performance, software performance, and a general usage network of the client terminal.

12. The method of claim 10, wherein the dynamic parameter includes at least one of a usage rate of a server communicating the client terminal, a processing speed or response speed of the server, a network speed, a network bandwidth, and object complexity.

13. The method of claim 10, wherein the unavoidable parameter includes an on/off state of the network.

14. The method of claim 8, wherein when it is determined that a resulting accuracy of the object recognition does not satisfy a predetermined reference, the request for object recognition is transmitted to the server.

15. A non-transitory computer-readable recording medium having recorded thereon a program for implementing the method of claim 8.

* * * * *